(12) United States Patent
Seeliger

(10) Patent No.: US 9,301,445 B1
(45) Date of Patent: Apr. 5, 2016

(54) GRAIN DEFLECTOR FOR COMBINE HEAD

(71) Applicant: Dennis Seeliger, Princeton, WI (US)

(72) Inventor: Dennis Seeliger, Princeton, WI (US)

(*) Notice: Subject to any disclaimer, the term of this patent is extended or adjusted under 35 U.S.C. 154(b) by 0 days.

(21) Appl. No.: 14/573,936

(22) Filed: Dec. 17, 2014

(51) Int. Cl.
*A01D 89/00* (2006.01)
*A01D 41/12* (2006.01)
*A01F 12/46* (2006.01)

(52) U.S. Cl.
CPC .............. *A01D 41/12* (2013.01); *A01D 89/008* (2013.01); *A01F 12/46* (2013.01)

(58) Field of Classification Search
USPC .......................................... 56/14.5, 190, 364
See application file for complete search history.

(56) References Cited

U.S. PATENT DOCUMENTS

| | | | | |
|---|---|---|---|---|
| 2,526,141 A * | 10/1950 | Knowlton | ............... | A01D 45/30 56/126 |
| 2,729,048 A * | 1/1956 | Dort | ....................... | A01D 89/00 198/506 |
| 2,774,210 A * | 12/1956 | Kay | ....................... | A01D 41/14 198/513 |
| 3,070,221 A | 12/1962 | Bobrowski | | |
| 3,109,273 A * | 11/1963 | Soldner | ................... | A01D 75/20 296/105 |
| 3,132,459 A * | 5/1964 | Grillot | ................... | A01F 15/101 100/188 R |
| 3,165,874 A * | 1/1965 | Osteen | ................... | A01D 57/10 56/1 |
| 3,224,177 A * | 12/1965 | Adee | ...................... | A01D 82/00 56/1 |
| 3,251,453 A | 5/1966 | Robson, Jr. | | |
| 3,474,602 A * | 10/1969 | Molzahn | ................ | A01D 43/00 56/14.4 |
| 3,886,675 A | 6/1975 | Maisonneuve et al. | | |
| 3,963,112 A | 6/1976 | Crego | | |
| 4,330,982 A * | 5/1982 | Vissers | ................... | A01D 57/30 56/14.5 |
| 4,720,962 A * | 1/1988 | Klinner | ................ | A01D 43/102 460/105 |
| 4,727,977 A | 3/1988 | Arnson | | |
| 4,790,128 A * | 12/1988 | Klinner | ................... | A01D 41/06 56/364 |
| 4,825,628 A * | 5/1989 | Brooks | .................. | A01D 57/08 56/14.5 |
| 4,920,737 A * | 5/1990 | Wieneke | ................ | A01D 23/06 56/249 |
| 5,249,751 A | 10/1993 | Schuler | | |
| 5,557,912 A * | 9/1996 | Voss | ....................... | A01D 41/06 56/130 |
| 7,857,120 B1 | 12/2010 | Perring et al. | | |
| 2009/0249757 A1* | 10/2009 | Diederich, Jr. | ........ | A01D 61/004 56/6 |
| 2012/0311987 A1* | 12/2012 | Koch | ..................... | A01D 41/14 56/229 |
| 2013/0298516 A1* | 11/2013 | Houston | ................ | A01D 41/12 56/207 |

* cited by examiner

Primary Examiner — Alicia Torres

(57) ABSTRACT

A grain deflector assembly includes a combine head that has a pair of lateral walls and a rear wall extending therebetween. The rear wall has an intake chute extending therethrough. An auger extends between the lateral walls. The auger is positioned in front of the intake chute. A frame has a first end, a second end and a rear side and a front side each extending between the first end and the second end. The frame is coupled to the combine head. The frame extends between the lateral walls. The frame is positioned over the intake chute. The frame extends forwardly over the auger. A panel is coupled to the frame. The panel extends between the first end, the second end, the front side and the rear side. The panel may deflect grain tossed upwardly by the auger such that the grain is directed into the intake chute.

3 Claims, 3 Drawing Sheets

GRAIN DEFLECTOR FOR COMBINE HEAD

BACKGROUND OF THE DISCLOSURE

Field of the Disclosure

The disclosure relates to deflector devices and more particularly pertains to a new deflector device for decreasing an amount of grain wasted by a combine head.

SUMMARY OF THE DISCLOSURE

An embodiment of the disclosure meets the needs presented above by generally comprising a combine head that has a pair of lateral walls and a rear wall extending therebetween. The rear wall has an intake chute extending therethrough. An auger extends between the lateral walls. The auger is positioned in front of the intake chute. A frame has a first end, a second end and a rear side and a front side each extending between the first end and the second end. The frame is coupled to the combine head. The frame extends between the each of the lateral walls. The frame is positioned over the intake chute. The frame extends forwardly over the auger. A panel is coupled to the frame. The panel extends between the first end, the second end, the front side and the rear side. The panel may deflect grain tossed upwardly by the auger such that the grain is directed into the intake chute.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
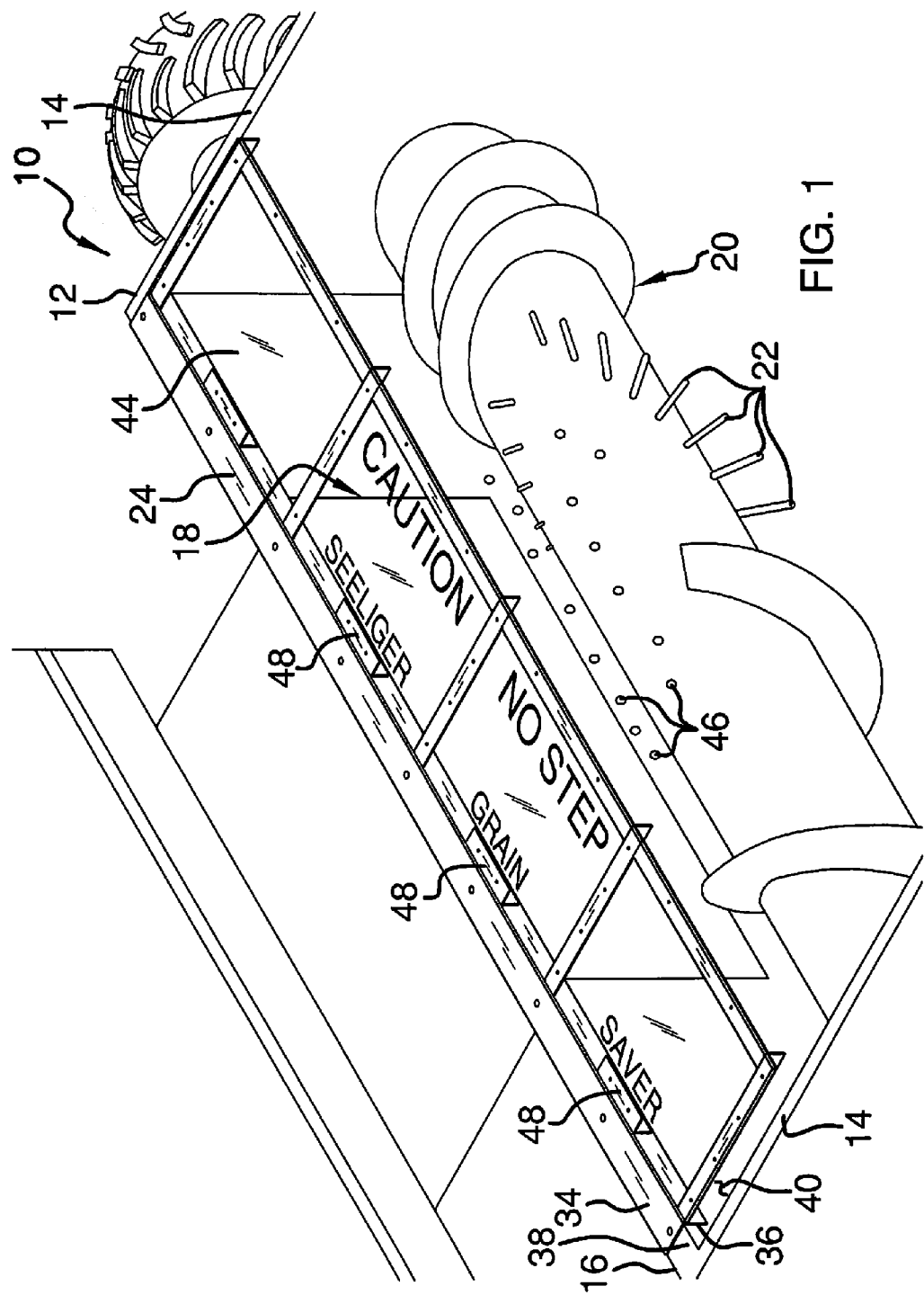
FIG. 1 is an in-use view of a grain deflector assembly according to an embodiment of the disclosure.
Figure 2:
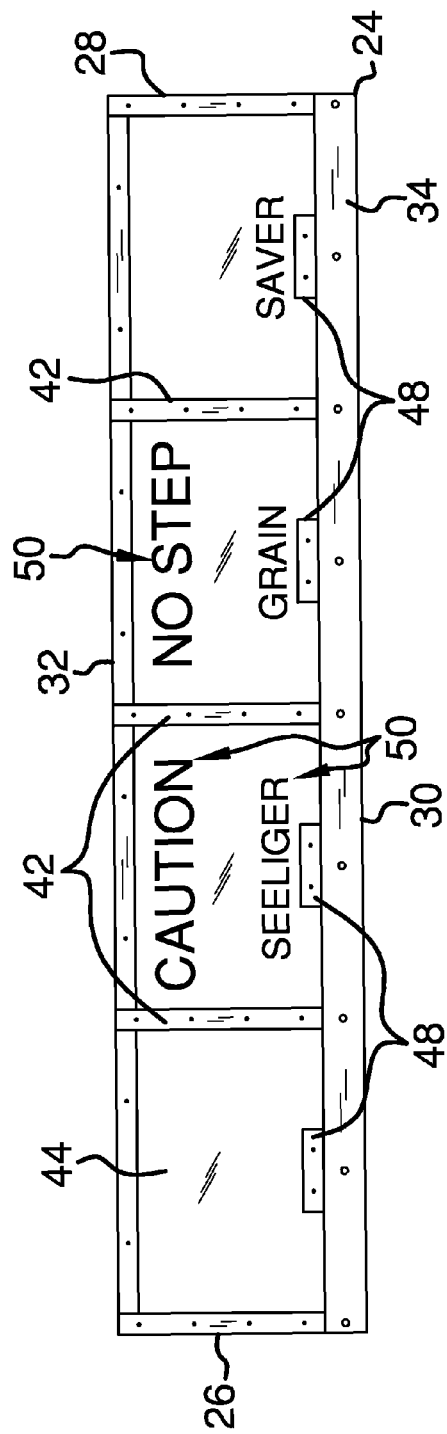
FIG. 2 is a top view of an embodiment of the disclosure.
Figure 3:
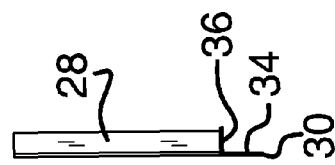
FIG. 3 is a right side view of an embodiment of the disclosure.
Figure 4:
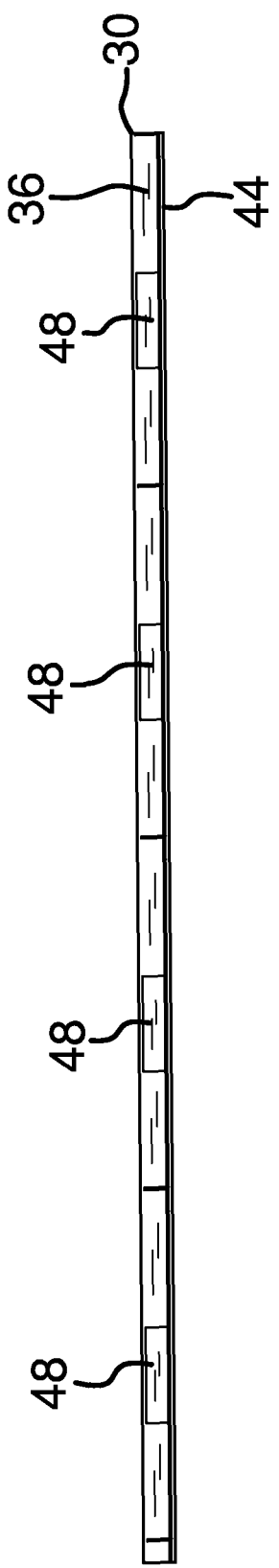
FIG. 4 is a front view of an embodiment of the disclosure.

With reference now to the drawings, and in particular to FIGS. 1 through 4 thereof, a new deflector device embodying the principles and concepts of an embodiment of the disclosure and generally designated by the reference numeral 10 will be described.

As best illustrated in FIGS. 1 through 4, the grain deflector assembly 10 generally comprises a combine head 12 that has a pair of lateral walls 14 and a rear wall 16 extending therebetween. The rear wall 16 has an intake chute 18 extending therethrough. An auger 20 extends between the lateral walls 14. The auger 20 is positioned in front of the intake chute 18. The auger 20 includes a plurality of fingers 22. The combine head 12 may be a combine harvester head of any conventional design utilized in the convention of grain crop harvesting.

A frame 24 is provided. The frame 24 has a first end 26, a second end 28 and a rear side 30 and a front side 32 each extending between the first end 26 and the second end 28. The rear side 30 has a first section 34 forming and angle with a second section 36. The first section 34 is coupled to a top edge 38 of the rear wall 16. The second section 36 abuts a front surface 40 of the rear wall 16, retaining the frame 24 in a horizontal orientation.

The frame 24 extends between the each of the lateral walls 14. The frame 24 is positioned over the intake chute 18. Moreover, the frame 24 extends forwardly over the auger 20. The frame 24 includes a plurality of longitudinal members 42 each coupled to and extending between the front side 32 and the rear side 30. The longitudinal members 42 are distributed between the first end 26 and the second end 28. The frame 24 may be comprised of a rigid material such as angle iron.

A panel 44 is coupled to the frame 24. The panel 44 extends between the first end 26, the second end 28, the front side 32 and the rear side 30. The panel 44 deflects grain 46 tossed upwardly by the fingers 22 of the auger 20, directing the grain 46 into the intake chute 18. The panel 44 may be comprised of a rigid, translucent material such as polycarbonate.

A plurality of supports 48 is provided. The supports 48 are coupled to the second section 36. The supports 48 are distributed between the first end 26 and the second end 28. The supports 48 support the panel 44 on the rear side 30 of the frame 24. Indicia 50 may be printed on the panel 44. The indicia 50 may comprise words.

In use, the assembly 10 is utilized while harvesting the grain 46. The panel 44 increases a total yield of the harvesting by decreasing an amount of grain 46 thrown out of the combine head 12 by the fingers 22. The frame 24 and the panel 44 are removable from the combine head 12 for cleaning or for servicing purposes.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grain deflector assembly configured to prevent grain from escaping an auger on a combine, said assembly comprising:

a combine head having a pair of lateral walls and a rear wall extending therebetween, said rear wall having an intake chute extending therethrough;

an auger extending between said lateral walls, said auger being positioned in front of said intake chute;

a frame having a first end, a second end and a rear side and a front side each extending between said first end and said second end, said frame being coupled to said combine head, said frame extending between said each of said lateral walls, said frame being positioned over said intake chute, said frame extending forwardly over said auger, wherein said rear side has a first section forming an angle with a second section, said first section being coupled to a top edge of said rear wall, said second section abutting a front surface of said rear wall such that said frame is retained in a horizontal orientation;

a panel coupled to said frame, said panel extending between said first end, said second end, said front side and said rear side, said panel being configured to deflect grain tossed upwardly by said auger such that the grain is directed into said intake chute; and a plurality of supports coupled to said second section, said supports being distributed between said first end and said second end, said supports supporting said panel on said frame.

2. The assembly according to claim 1, wherein said frame including a plurality of longitudinal members each coupled to and extending between said front side and said rear side.

3. A grain deflector assembly configured to prevent grain from escaping an auger on a combine, said assembly comprising:

a combine head having a pair of lateral walls and a rear wall extending therebetween, said rear wall having an intake chute extending therethrough;

an auger extending between said lateral walls, said auger being positioned in front of said intake chute;

a frame having a first end, a second end and a rear side and a front side each extending between said first end and said second end, said rear side having a first section forming and angle with a second section, said first section being coupled to a top edge of said rear wall, said second section abutting a front surface of said rear wall such that said frame is retained in a horizontal orientation, said frame extending between said each of said lateral walls, said frame being positioned over said intake chute, said frame extending forwardly over said auger, said frame including a plurality of longitudinal members each coupled to and extending between said front side and said rear side, said longitudinal members being distributed between said first end and said second end;

a panel coupled to said frame, said panel extending between said first end, said second end, said front side and said rear side, said panel being configured to deflect grain tossed upwardly by said auger such that the grain is directed into said intake chute; and a plurality of supports coupled to said second section, said supports being distributed between said first end and said second end, said supports supporting said panel on said frame.

* * * * *